United States Patent
Arnold et al.

[11] Patent Number: 6,062,028
[45] Date of Patent: May 16, 2000

[54] LOW SPEED HIGH PRESSURE RATIO TURBOCHARGER

[75] Inventors: Steven Don Arnold, Rancho Palos Verde; Gary D. Vrbas, Wilmington, both of Calif.

[73] Assignee: Allied Signal Inc., Morristown, N.J.

[21] Appl. No.: 09/109,538

[22] Filed: Jul. 2, 1998

[51] Int. Cl.[7] .................................................. F02B 35/44
[52] U.S. Cl. ............................................. 60/612; 417/407
[58] Field of Search ................................ 60/612; 417/407

[56] References Cited

U.S. PATENT DOCUMENTS 4,032,262  6/1977  Zehnder .................................. 417/409
4,155,684  5/1979  Curiel et al. ........................... 417/409

*Primary Examiner*—Noah Kamen
*Attorney, Agent, or Firm*—Felix L. Fischer

[57] ABSTRACT

A low speed high pressure ration turbocharger incorporates a compressor impeller having impeller blades for a first stage of compression mounted on a first side of the wheel and impeller blades for a second stage of compression mounted on a second side of the wheel. Driving the dual sided compressor impeller on a common shaft from the turbine wheel allows reduction in rotational speeds while increasing compression ratio of the turbine. The scroll inlet and outlet volute for the second stage inducer are integrated with the compressor housing or other portions of the turbocharger case for compact packaging.

9 Claims, 5 Drawing Sheets

LOW SPEED HIGH PRESSURE RATIO TURBOCHARGER

BACKGROUND OF THE INVENTION

1. Field of the Invention

The present invention relates generally to high pressure ratio turbochargers. More particularly, a turbocharger is provided having a two stage compressor with back-to-back radial flow compressor wheels with integral air flow ducting allowing a reduction in the rotational speed of the turbocharger while increasing pressure ratio over conventional units.

2. Description of the Related Art

Developments in the turbocharger field continue to require increased pressure ratios as a means for providing improved fuel economy, higher power ratings and improved emissions performance for engines on which turbochargers are employed, particularly for commercial diesel application. With conventional turbocharger designs, the sole method for achieving such increased pressure ratios has been to increase the rotational speed of the compressor and turbine components. Current pressure ratio capability for turbochargers of conventional design is typically in the 3.5 range, although some specialized applications operate at 4.0. Currently, the only known method for increasing the pressure ratio capability of a compressor for a given maximum rotational tip speed, is to reduce the backward curvature of the blades. Backward curvature is used to improve the flow range capability of a compressor as well as to improve the efficiency, thus reducing the backward curvature results in less efficiency and a narrower flow range. Requirements for commercial diesel engines for trucking and industrial applications are rapidly approaching pressure ratios of 5 to 6 and possibly higher with flow ranges of over 2.5/1 choke flow to surge flow. Material property limits are exceeded in the rotating components of conventional turbocharger designs at these pressure ratios due to the stresses imposed by the required high rotational speeds. For a turbo using a traditional single stage compressor design, the optimum turbine design for efficiency cannot be used due to the high inertia of a low specific speed design. High inertia reduces the response of the turbocharger to meet the transient requirements of the engine.

Multiple stage compression through the use of two or more turbochargers operating with their compressors in series has been an approach to meeting elevated pressure ratio requirements. However, the cost and complexity of such systems as well as the packaging size requirements are unattractive for most applications. The use of multiple compressor wheels on a common shaft to obtain compression stages, including combining axial and radial compression stages, has also been employed in the prior art. Packaging constraints, particularly length of the turbocharger, rotor dynamics and bearing issues have similarly rendered these designs commercially unacceptable in most cases.

It is, therefore, desirable to provide a turbocharger having a high compression ratio with minimal packaging size increase and reduced complexity over prior art designs. Maintaining a part count comparable to existing commercial diesel turbocharger designs is also desired to keep costs at an acceptable level.

It is also desirable to provide a turbocharger having increased turbine efficiency by reducing turbine rotational speed thus allowing use of a highly efficient low specific speed turbine.

SUMMARY OF THE INVENTION

A turbocharger incorporating the present invention has a case including a turbine housing receiving exhaust gas from an exhaust manifold of an internal combustion engine at an inlet and having an exhaust outlet, a compressor housing having an air inlet and a first volute, and a center housing between the turbine housing and compressor housing. A turbine wheel is carried within the turbine housing and extracts energy from the exhaust gas and the turbine wheel is connected to a shaft extending from the turbine housing through a shaft bore in the center housing. A bearing system supported in the shaft bore of the center housing supports the shaft for rotational motion. A compressor impeller connected to the shaft opposite the turbine wheel is carried within the compressor housing and incorporates a first plurality of impeller blades mounted on a front face adjacent the air inlet. The first plurality of blades provides a first stage compression of air from the air inlet and exhausts air into the first diffuser and volute. The compressor impeller also incorporates a second plurality of impeller blades mounted on a back face, the second plurality of blades compressing air from a scroll inlet connected to the first volute, and exhausting air into a second diffuser and volute having a charge air outlet connected to an inlet manifold for the engine. The scroll inlet and second volute are integral to the case and are positioned between the compressor housing and turbine housing.

BRIEF DESCRIPTION OF THE DRAWINGS

The details and features of the present invention will be more clearly understood with respect to the detailed description and drawings in which:

FIG. 3b is a section view along line A—A of FIG. 3a;

FIG. 3c is a section view along line B—B of FIG. 3a;

DETAILED DESCRIPTION OF THE INVENTION

Figure 1:
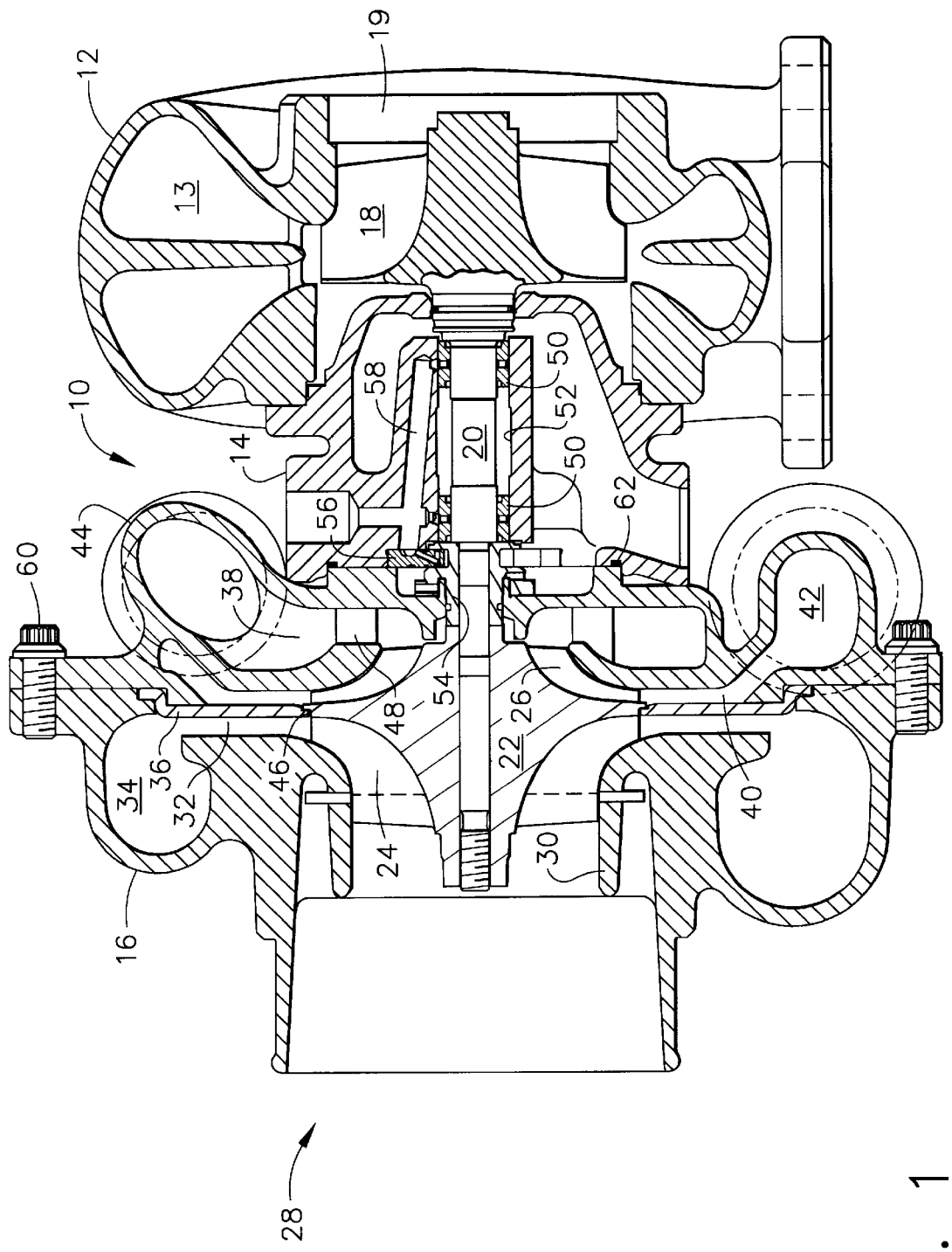
FIG. 1 is a cross-section elevation view of a turbocharger employing an embodiment of the invention.

Referring to the drawings, FIG. 1 shows an embodiment of the invention for a turbocharger 10 which incorporates a turbine housing 12, a center housing 14 and a compressor housing 16. Turbine wheel 18 is connected through shaft 20 to compressor wheel 22 which incorporates an outer impeller 24 and an inner impeller 26 comprising blades mounted on an extended backwall of the impeller wheel. The turbine wheel converts energy from the exhaust gas of an internal combustion engine provided from an exhaust manifold (not shown) to a volute 13 in the turbine housing. The exhaust gas is expanded through the turbine and exits the turbine housing through outlet 19.

The compressor housing incorporates an inlet 28, which for the embodiment shown in the drawings, includes a ported shroud 30. The outer impeller constitutes a first stage for the compressor with flow exiting through a first diffuser 32 into a first volute 34. The inner wall of the first diffuser is formed by baffle 36. The inner impeller provides a second stage for the compressor, receiving air from the first volute through an inlet 38 and exiting from the impeller through second diffuser 40 into a second volute 42. For the embodiment shown in FIG.1, inlet 38 and the second volute are provided in a second stage casting 44 which is mounted between the compressor housing and center housing. Baffle 36 acts as the outer wall of the second diffuser and a stepped shear force pumping seal 46 between the baffle and the compressor rotor minimizes leakage from the second stage diffuser into the first stage diffuser. Inlet vanes 48 for improved inlet condition and flow uniformity are shown for the embodiment of FIG. 1.

The compressor wheel mounting impeller blades on both the front and back surface in combination with the second stage casting providing integral flow paths for second stage inlet and outlet minimizes the increase in overall length of the turbocharger. The first volute is closely coupled to the second stage inlet and the second volute provides an output at a location substantially identical to a single stage configuration for plumbing to the inlet manifold of the engine. In addition, the impact on bearing configuration is minimal due to limited increase in overhang length.

Journal bearings 50 mounted in the shaft bore 52 of the center housing rotationally support the shaft. A thrust collar 54 mounted to the shaft adjacent the compressor wheel engages a thrust bearing 56 constrained between the center housing and second stage casting for the embodiment shown. Lubrication channels 58 provide lubricant to the bearings. Back to back mounting of the compressor first and second stage impellers additionally tends to balance axial aerodynamic loading by the compressor.

The second stage casting is attached to the compressor housing and center housing using bolts 60 or other means known in the art, including being integral with the bearing housing, with appropriate seals 62. The baffle is received and constrained between the compressor housing and second stage casting for the embodiment shown in FIG. 1.

Figure 2:
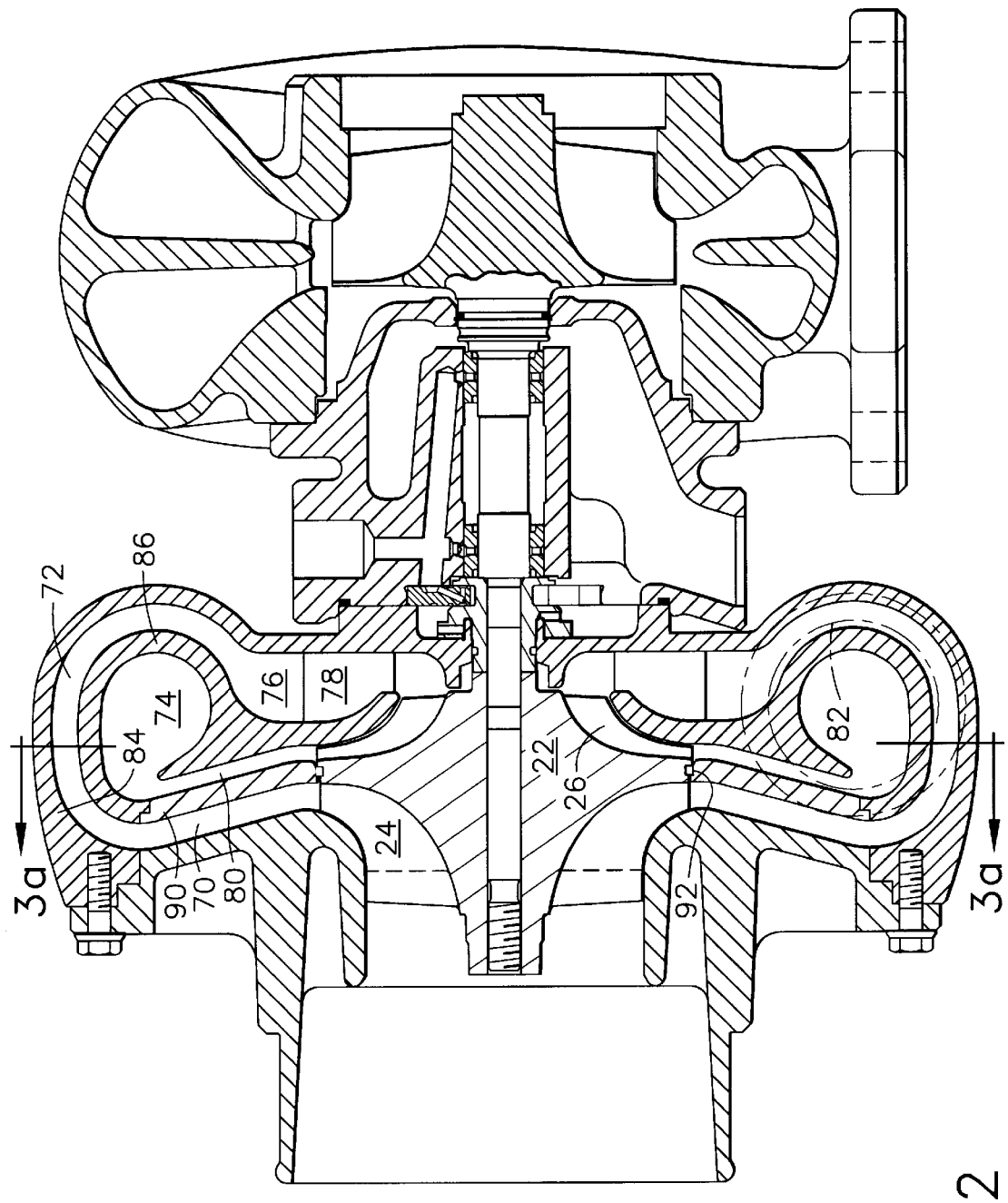
FIG. 2 is a cross section elevation view of a second embodiment of the invention with a semi-concentric dual volute for the compressor stages.
Figure 3A:
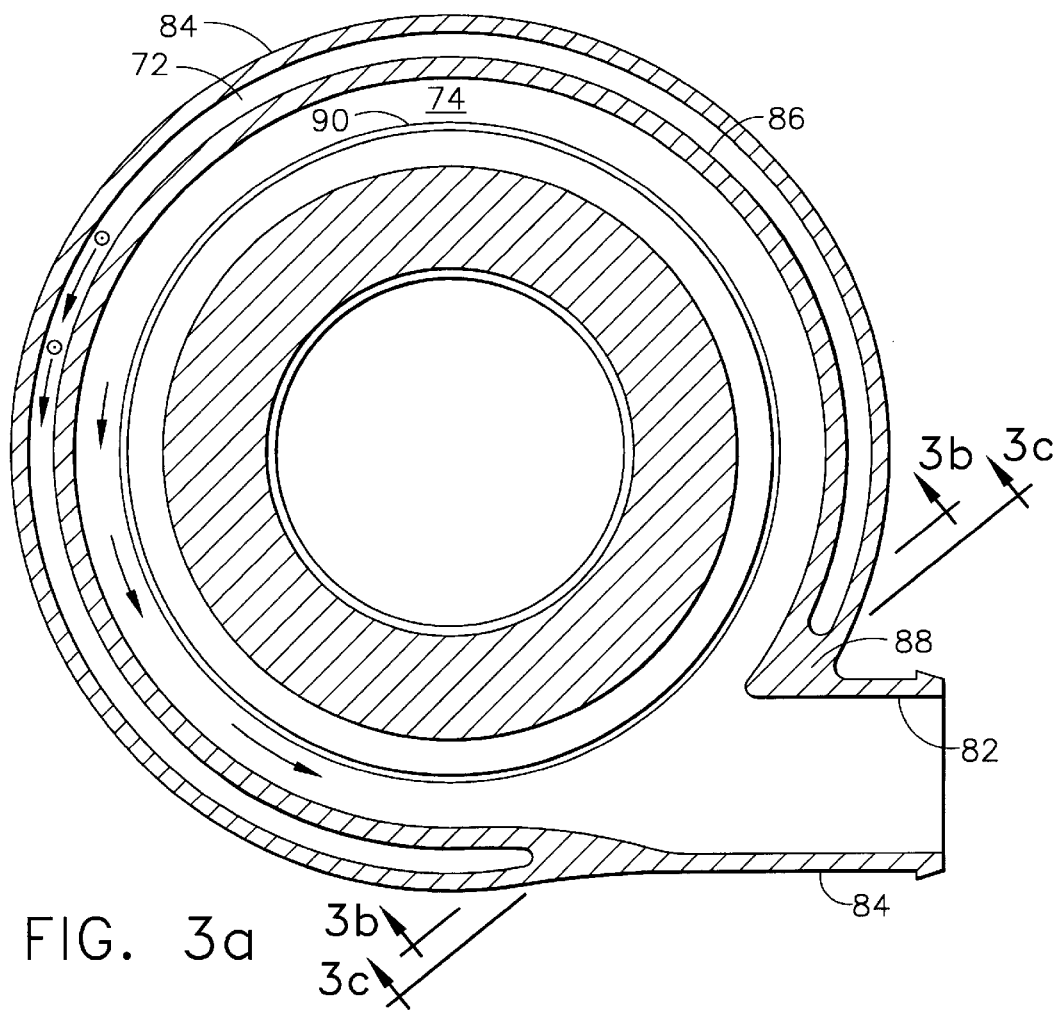
FIG. 3a is an end section view of the transition portion of the first compressor volute to the second stage compressor inlet.
Figure 3B:
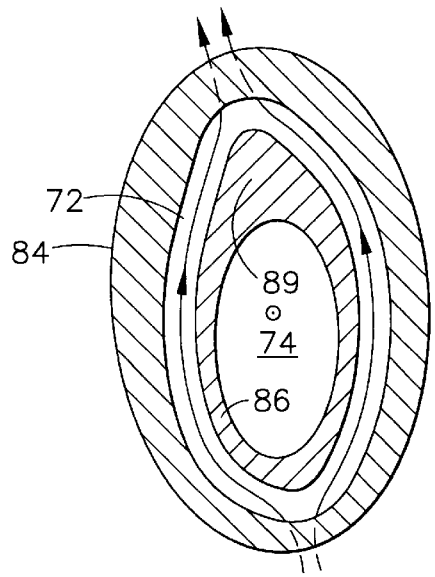
Figure 3C:
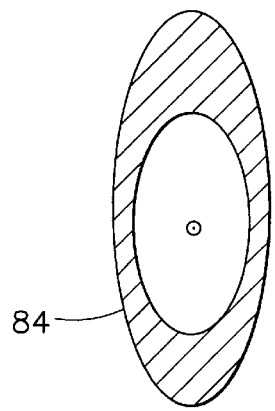

A second embodiment of the present invention is shown in FIG.2. The turbine housing and center housing with their associated elements are substantially identical in this embodiment to that disclosed and described with respect to FIG. 1. The inlet and first stage or outer impeller 24 of the compressor are similar to that disclosed in FIG. 1 however, a diffuser 70 directs flow into a first stage volute 72 which substantially surrounds a second stage volute 74. Air flowing through the first stage volute is directed tangentially, as best seen in FIG. 3, to an inlet 76 for the second stage compressor. Inlet vanes 78 direct the air into the second stage impeller 26. Air exiting the second stage impeller passes through a second diffuser 80 into the second stage volute. Air exits from the second stage volute through outlet 82. The first stage volute and second stage volute for the embodiment shown in FIGS. 2 and 3 have substantially constant cross sections. Alternative embodiments employ a varying cross section such as that disclosed in FIG. 1.

For the embodiment shown in FIG.s 2, an outer wall 84 of the first stage volute and a wall structure 86 forming the second stage inlet and second volute comprise a common casting. As best seen in FIG. 3a, wall structure 86 is supported from the outer wall 84 by an interconnection section 88 integral with the outlet. The interconnection section has a double wedge or diamond profile 89 extending between wall structure 86 and outer wall 84 to tangentially direct the air flowing through the first stage volute around the wall structure into the inlet for the second stage. Similar to the first embodiment, a baffle 90 is connected to wall structure 86 for segregation of the first stage diffuser airflow from the second stage diffuser airflow. A dynamic seal 92 is provided between the impeller wheel and baffle.

Figure 4:
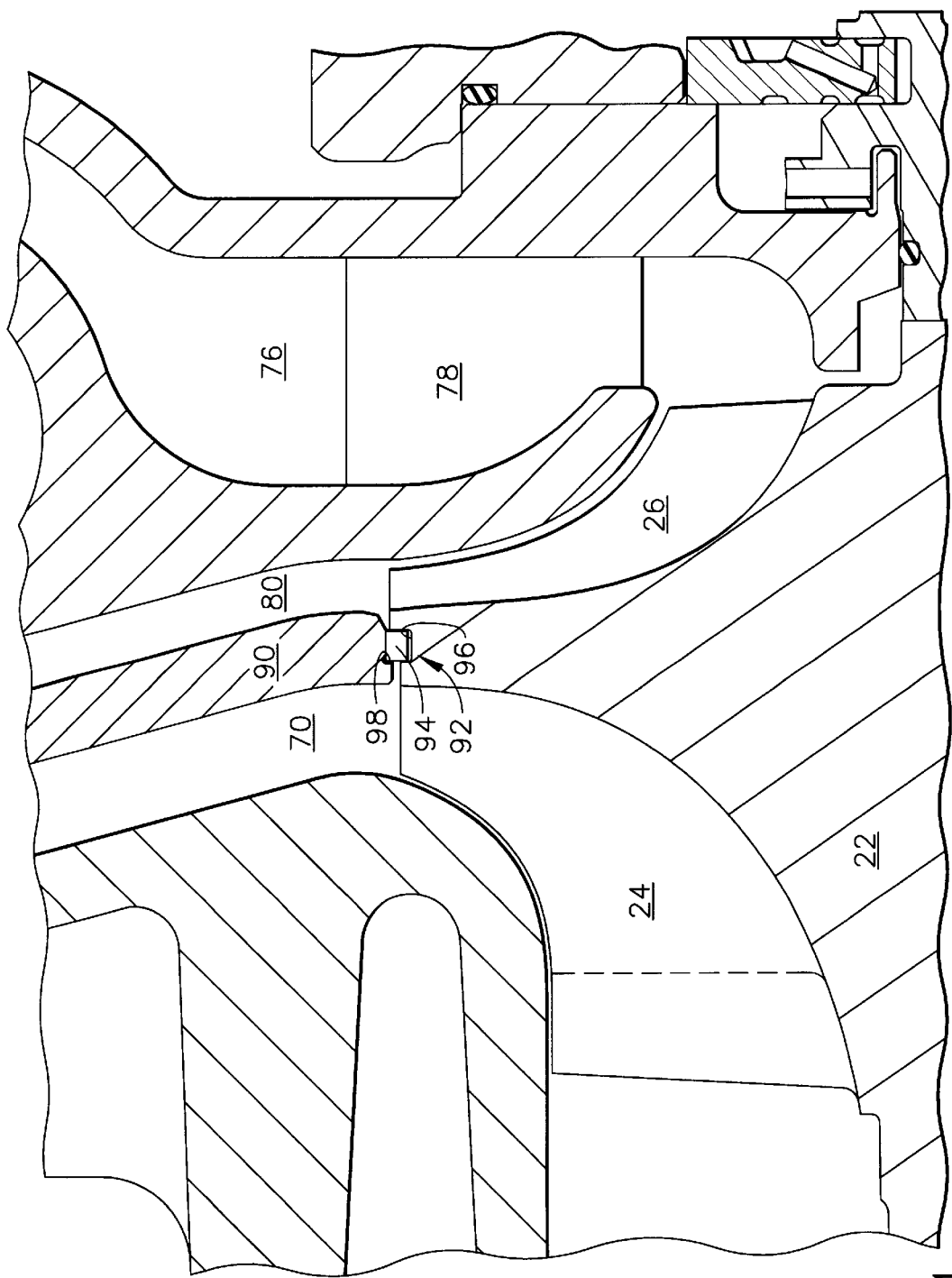
FIG. 4 is a section view of one embodiment for the compressor impeller wheel peripheral seal.

FIG. 4 shows an embodiment for the dynamic seal 92. The seal incorporates a seal ring 94 which is received in a peripheral groove 96 in the impeller wheel. The baffle carries the seal ring on a relieved step 98 for positioning and the seal is physically effected by the labyrinth formed by the seal ring and peripheral groove.

Figure 5:
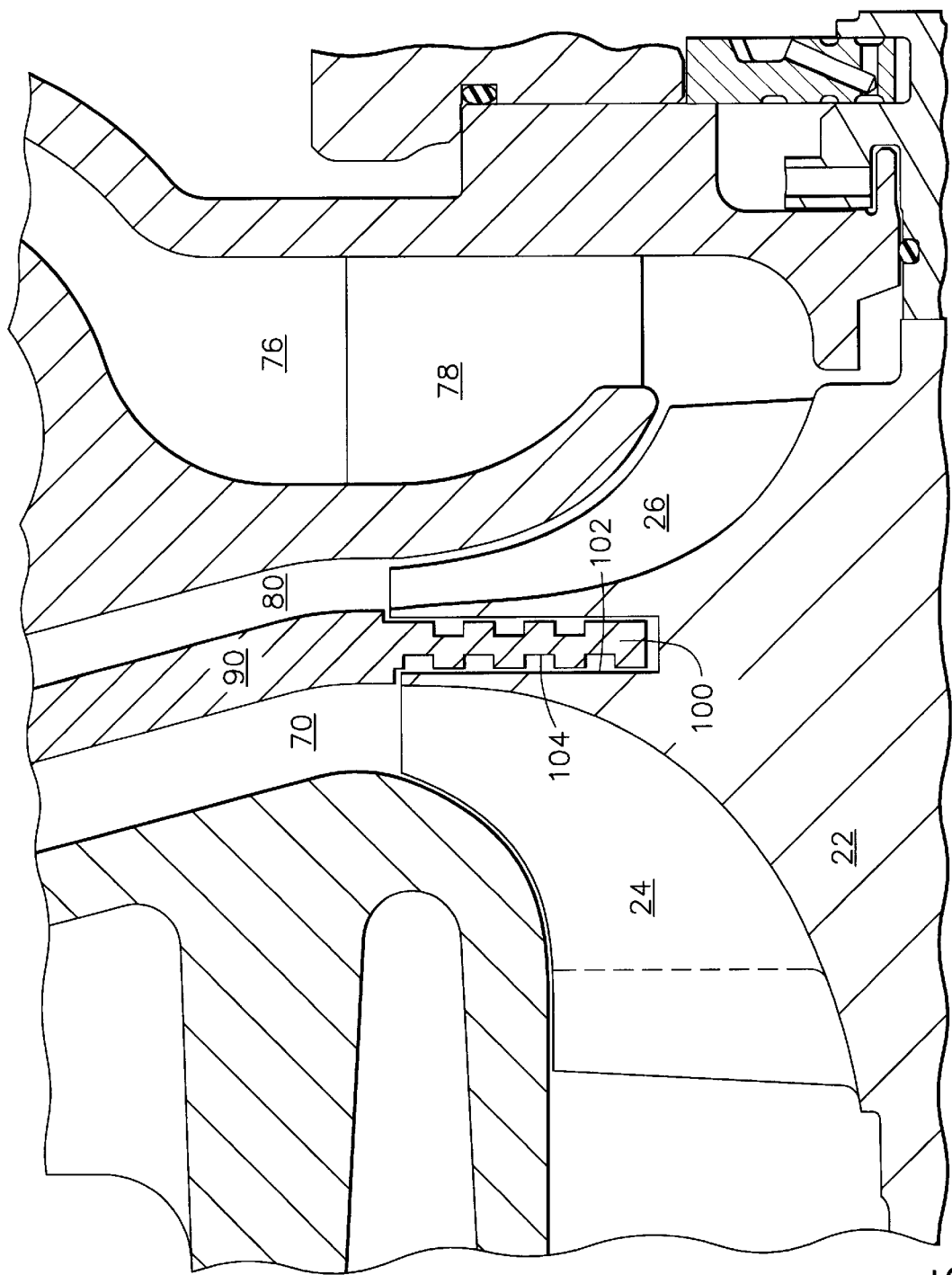
FIG. 5 is a section view of a second embodiment for the compressor impeller wheel peripheral seal.

FIG. 5 shows a second embodiment for the dynamic seal that constitutes an extension 100 of the baffle, which is received into a slot 102 in the impeller wheel. The seal is accomplished by the serpentine surface 104 of the extension. For the embodiment shown, the baffle comprises at least two semicylindrical pieces that are assemble around the impeller wheel to insert the extension into the slot. In alternative embodiments, the impeller wheel is split along a separation line contiguous with the slot to allow assembly of the impeller wheel around the extension of the baffle.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A turbocharger comprising:
   a case having a turbine housing receiving exhaust gas from an exhaust manifold of an internal combustion engine at an inlet and having an exhaust outlet, a compressor housing having an air inlet and a first volute, and a center housing intermediate the turbine housing and compressor housing;
   a turbine wheel carried within the turbine housing and extracting energy from the exhaust gas, said turbine wheel connected to a shaft extending from the turbine housing through a shaft bore in the center housing;
   a bearing supported in the shaft bore of the center housing, said bearing supporting the shaft for rotational motion;
   a compressor impeller connected to the shaft opposite the turbine wheel and carried within the compressor housing, said compressor impeller having a first plurality of impeller blades mounted on a front face proximate the air inlet, said first plurality of blades increasing the velocity of air from the air inlet and exhausting air into the first volute, said compressor impeller also having a second plurality of impeller blades mounted on a back face, said second plurality of blades increasing the velocity of air from a scroll inlet connected to the first volute, and exhausting air into a second volute having a charge air outlet connected to an inlet manifold for the engine, said scroll inlet and second volute integral to the case intermediate said compressor housing and turbine housing.

2. A turbocharger as defined in claim 1 further comprising:
   a first diffuser intermediate the compressor wheel and first volute and a second diffuser intermediate the compressor wheel and the second volute, the first and second diffusers separated by a common wall extending from a peripheral circumference of the compressor wheel to the first and second volutes; and
   means for creating a dynamic seal between the common wall and compressor wheel.

3. A turbocharger as defined in claim 2 wherein the common wall comprises a baffle extending from the compressor housing proximate the first volute.

4. A turbocharger as defined in claim 1 wherein the second scroll inlet and second volute are integral with the center housing containing the bearing and lubrications system.

5. A turbocharger as defined in claim 2 wherein the means for creating a dynamic seal comprises:

a seal ring received in a peripheral groove in the compressor impeller and carried by a relieved shoulder extending radially inward from the common wall proximate the impeller wheel peripheral circumference.

6. A turbocharger as defined in claim 2 wherein the means for creating a dynamic seal comprises:

an extended portion of the common wall closely received in a slot in the peripheral circumference of the impeller wheel, said extended portion having a serpentine surface on at least one side thereof.

7. A turbocharger comprising:

a case having a turbine housing receiving exhaust gas from an exhaust manifold of an internal combustion engine at an inlet and having an exhaust outlet, a compressor housing having an air inlet and a first volute, and a center housing intermediate the turbine housing and compressor housing;

a turbine wheel carried within the turbine housing and extracting energy from the exhaust gas, said turbine wheel connected to a shaft extending from the turbine housing through a shaft bore in the center housing;

a bearing supported in the shaft bore of the center housing, said bearing supporting the shaft for rotational motion;

a compressor impeller connected to the shaft opposite the turbine wheel and carried within the compressor housing, said compressor impeller having a first plurality of impeller blades mounted on a front face proximate the air inlet, said first plurality of blades increasing the velocity of air from the air inlet and exhausting air into the first volute, said compressor impeller also having a second plurality of impeller blades mounted on a back face, said second plurality of blades increasing the velocity of air from an inlet connected to the first volute, and exhausting air into a second volute having a charge air outlet connected to an inlet manifold for the engine, said second volute substantially concentrically contained within the first volute and the outlet including an interconnection section extending through an outer wall of the first volute.

8. A turbocharger as defined in claim 7 wherein the interconnection section is wedge shaped.

9. A turbocharger as defined in claim 7 further comprising:

a first diffuser intermediate the compressor wheel and first volute and a second diffuser intermediate the compressor wheel and the second volute, the first and second diffusers separated by a common wall extending from a peripheral circumference of the compressor wheel to the first and second volutes; and means for creating a dynamic seal between the common wall and compressor wheel.

\* \* \* \* \*